United States Patent
Takagi et al.

(10) Patent No.: US 7,069,954 B2
(45) Date of Patent: Jul. 4, 2006

(54) COMPOSITE HOSE WITH A CORRUGATED METAL TUBE

(75) Inventors: Yuji Takagi, Komaki (JP); Minoru Hiramatsu, Kasugai (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 11/070,589

(22) Filed: Mar. 2, 2005

(65) Prior Publication Data

US 2005/0211324 A1 Sep. 29, 2005

(30) Foreign Application Priority Data

Mar. 29, 2004 (JP) ............................. 2004-096859

(51) Int. Cl.
*F16L 11/00* (2006.01)

(52) U.S. Cl. ...................... 138/121; 138/137; 138/139; 138/122; 138/143

(58) Field of Classification Search ................ 138/121, 138/122, 109, 137, 139, 140; 285/256, 258, 285/259, 903, 222.4, 222.5, 242, 382
See application file for complete search history.

(56) References Cited

U.S. PATENT DOCUMENTS

| | | | | |
|---|---|---|---|---|
| 2,449,369 | A * | 9/1948 | Doane et al. | 138/121 |
| 3,580,289 | A * | 5/1971 | James et al. | 138/121 |
| 4,147,185 | A * | 4/1979 | Hines | 138/121 |
| 4,369,992 | A * | 1/1983 | Fournier et al. | 285/256 |
| 4,384,595 | A * | 5/1983 | Washkewicz et al. | 138/127 |
| 4,429,290 | A * | 1/1984 | Devan | 333/241 |
| 4,758,029 | A * | 7/1988 | Davis | 285/253 |
| 5,279,333 | A * | 1/1994 | Lawrence | 138/121 |
| 5,601,893 | A * | 2/1997 | Strassel et al. | 428/35.9 |
| 5,876,548 | A * | 3/1999 | Strassel et al. | 156/244.15 |
| 6,354,332 | B1 | 3/2002 | Burkhardt et al. | 138/109 |
| 2003/0066568 | A1* | 4/2003 | Hibino et al. | 138/121 |
| 2004/0020545 | A1* | 2/2004 | Takagi et al. | 138/109 |

* cited by examiner

*Primary Examiner*—Patrick Brinson
(74) *Attorney, Agent, or Firm*—Andrus, Sceales, Starke & Sawall, LLP (57) ABSTRACT

A composite hose is provided with a corrugated metal tube of an inner layer and rubber filler which is filled in valley gaps between corrugation hills on an outer peripheral side of the corrugated metal tube. A tubular hard resin layer is further provided as cover layer on an outer side of the corrugated metal tube in order to enclose the rubber filler within the valley gaps to prevent the rubber filler from escaping radially outwardly.

4 Claims, 7 Drawing Sheets

COMPOSITE HOSE WITH A CORRUGATED METAL TUBE

TECHNICAL FIELD

The present invention relates to a composite hose with a corrugated metal tube as a barrier layer against permeation of conveyed fluid, which is preferably usable for conveying fuel in automobiles, conveying refrigerant, conveying fuel of cell such as hydrogen gas used in a fuel cell or other applications.

BACKGROUND OF THE INVENTION

Typical rubber hoses, for example, made of a blend of acrylonitrile-butadiene rubber and polyvinyl chloride (NBR/PVC blend) which is excellent in resistance to gasoline permeability, have been used for conveying fuel (fuel such as gasoline for engine) for automobiles or the like in view of their high vibration-absorbability, easy assembling or the like. However, for the purpose of global environment protection, the regulations have been recently tighten against permeation of fuel for automobiles or the like, and are anticipated to be further tighten in the future. Therefore, such hoses for conveying fuel are required further permeation resistance to fuel.

And, hoses for conveying fuel such as hydrogen gas used in fuel cells, or for conveying carbon dioxide gas refrigerant are required extremely high permeation resistance to such conveyed fluid as hydrogen gas, carbon dioxide gas.

However, with regard to this requirement hoses configured by organic materials only such as rubber or resin are difficult to satisfy such required resistance.

Under the circumstances, it is considered to form preferably a composite hose by combining with a corrugated metal tube as a barrier layer against permeation of conveyed fluid.

For example, U.S. Pat. No. 6,354,332 discloses a composite hose with a corrugated metal tube of this type.

Meanwhile, a corrugated shape or a performance based on the shape provides a corrugated metal tube with an effect of flexibility. A material of the corrugated metal tube itself is metal and does not have elasticity different from rubber or the like.

So, a hose combined with a such corrugated metal tube involves a problem that during conveying fluid, an internal pressure is repeatedly exerted to the corrugated metal tube, the corrugated metal tube is deformed repeatedly in a radially expanding and contracting manner, and then a stress, which acts on the corrugated metal tube, brings a result that the corrugated metal tube is readily fatigue-broken at an early stage.

Specifically, when the corrugated metal tube expands radially, a maximum or large pulling stress or the largest pulling stress acts on corrugation hills. And, when it is repeated, the corrugation hills are readily cracked in a circumferentially direction.

On the other hand, corrugation valleys are distorted and deformed while the corrugated metal tube expands and contracts radially. And, due to repeated distortion and deformation, the corrugation valleys are also readily cracked in a circumferentially direction.

In the composite hose with a corrugated metal tube of this type which have been proposed traditionally, an elastic material such as rubber fills in valley gaps between corrugation hills on an outer peripheral side of the corrugated metal tube. The elastic material penetrating in the valley gaps as a result serve to restrain above deformation of the corrugation hills and the corrugation valleys of the corrugated metal tube.

However, in case of a conventional composite hose with a corrugated metal tube, the above-mentioned elastic material penetrating in the valley gaps are provided without an intention of restraining excessive deformation of the corrugation hills and valleys of a corrugated portion.

Then, the inventors of the present invention manufactured a sample of a composite hose with a corrugated metal tube where an elastic filler is provided in valley gaps between corrugation hills on an outer peripheral side of the corrugated metal tube with an intention of restraining excessive deformation of the corrugated metal tube, specifically, of corrugation hills and valleys thereof, and evaluate the sample.

Figure 6:
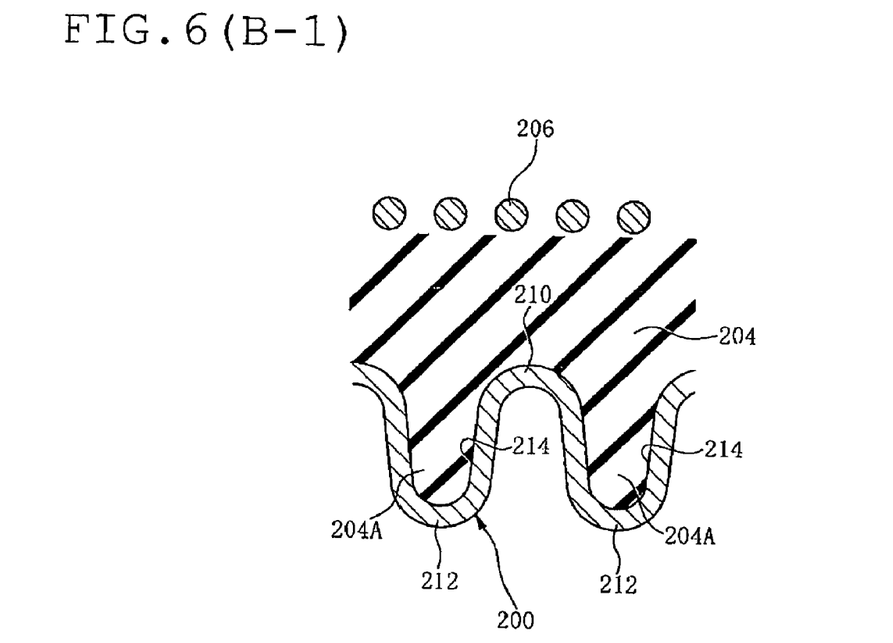
FIG. 6(A) is a view of a comparison example of a composite hose with a corrugated metal tube.
Figure 6A:
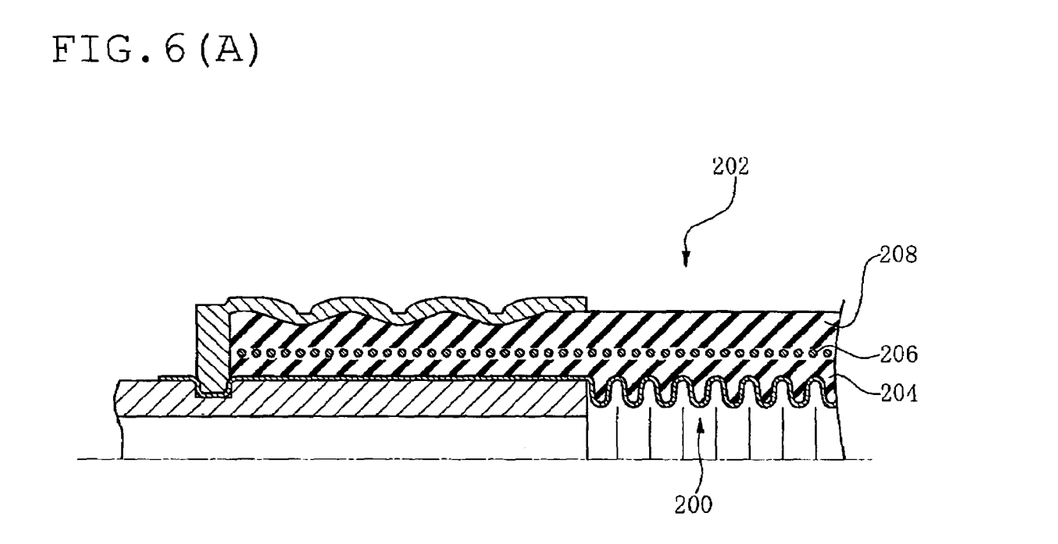

FIGS. 6(A), 6(B-1) and 6(B-2) show one sample as comparison example.

With reference to FIG. 6(A), reference numeral 200 indicates a corrugated metal tube of an inner layer of a composite hose 202 as a barrier layer against fluid permeation. Reference numeral 204 indicates an inner rubber layer, reference numeral 206 indicates a reinforcing layer formed by winding a reinforcing wire member, and reference numeral 208 indicates an outer rubber layer. Here, in the reinforcing layer 206, a winding density of the reinforcing wire member such as a reinforcing thread is 80% or less.

A part of the inner rubber layer 204 serves as an elastic filler 204A. As shown in FIG. 6(B-1), the elastic filler 204A penetrates in valley gaps 214 between corrugation hills 210, 210 of a corrugated portion on an outer peripheral side of the corrugated metal tube 200.

Reference numeral 212 indicates corrugation valleys of the corrugated portion.

The elastic filler 204A penetrating in the valley gaps 214 in such a manner serves to restrain excessive deformation of the corrugation hills 210 and the corrugation valleys 212, and this may restrain early fatigue fracture of the corrugated metal tube 200 resulting from a large pulling stress acting to the corrugation hills 210 and distortional deformation of the corrugation valleys 212.

However, in the composite hose with a corrugated metal tube shown in FIG. 6(A-1), although the elastic filler 204A is filled in the valley gaps 214 between the corrugation hills 210, 210, the corrugated metal tube 200 is not sufficiently durable and, as a result, the composite hose is not satisfactory in view of durable life.

Then, the inventors examined the cause of its insufficient durable life. It is found by the inventors that the elastic filler 204A penetrating in the valley gaps 214 escapes the valley gaps 214 radially outwardly under an internal pressure or the like which is exerted to the corrugated metal tube 200, as shown in FIG. 6(B-2), resulting that restraining force against deformation of the corrugation hills 210 and valleys 212 is diminished, the corrugation hills 210 and valleys 212 are largely deformed and it leads to fatigue fracture of the corrugated metal tube 200.

The present invention is made under the foregoing circumstances. It is an object of the present invention to provide a composite hose with a corrugated metal tube having a favorable durable life. In the present invention, the composite hose with a corrugated metal tube is constructed not to allow escape of the elastic filler filled in valley gaps between corrugation hills on outer peripheral side of the corrugated metal tube out of the valley gaps. Thus constructed composite hose is prevented from decrease in durable life.

SUMMARY OF THE INVENTION

According to the present invention, there is provided a novel composite hose with a corrugated metal tube. The composite hose comprises a corrugated metal tube as barrier layer against permeation of conveyed fluid, and elastic filler which is filled in valley gaps between corrugation hills on an outer peripheral side of the corrugated metal tube. The composite hose with a corrugated metal tube further comprises a cylindrical cover layer which is provided on an outer side of the corrugated metal tube. The cylindrical cover layer encloses or confines the elastic filler within the valley gaps to prevent the elastic filler from escaping radially outwardly.

The elastic filler may be a nonfoamed material. The cover layer may be a hard resin layer or the cover layer may be made of a hard resin material.

As stated above, according to the present invention, the elastic filler is filled in the valley gaps between the corrugation hills of the corrugated metal tube on the outer peripheral side of the corrugated metal tube and is enclosed within the valley gaps by providing the cylindrical cover layer on the outer side of the corrugated metal tube so as to prevent the elastic filler from escaping radially outwardly.

According to the present invention, when the corrugated metal tube expands and contracts radially, the elastic filler penetrating in the valley gaps is enclosed or confined therein and is not allowed to escape radially outwardly. So, the elastic filler can fulfill sufficiently its original function to restrain excessive deformation of the corrugation hills and valleys when the corrugated metal tube is deformed, and thereby to prevent fatigue fracture of the corrugated metal tube at an early stage.

Therefore, according to the present invention, a service life of a composite hose with a corrugated metal tube, which was short previously, can be prolonged.

As already stated, the elastic filler may be a nonfoamed material, and the cover layer may be a hard resin layer. A reinforcing layer (protective reinforcement layer) may be laminated directly on an outer surface of the hard resin layer. The reinforcing layer may be formed by braiding a reinforcing wire member or reinforcing filament member.

However, in the present invention, such cover layer may be a reinforcing or reinforced layer which is formed by winding or braiding a reinforcing wire member or reinforcing filament member at a high density of 95% or more, or a high winding/braiding density of 95% or more.

The corrugated metal tube may have a straight-wall portion of straight tubular shape on an end portion of the corrugated metal tube, and a socket fitting is securely compressed, for example, on an end portion (outer periphery of the end portion) of the hose body, in a diametrically contracting direction so as to press the straight-wall portion radially inwardly. The socket fitting presses the straight-wall portion, for example, via the cover layer which is the hard resin layer, the cover layer which is the reinforcing layer, or the cover layer which is the hard resin layer and the reinforcing layer (protective reinforcement layer) which is laminated directly on an outer surface of the cover layer.

Now, the preferred embodiments of the present invention will be described in detail with reference to the drawings.

BRIEF DESCRIPTION OF THE DRAWINGS

FIG. 6(B-1) is a cross-sectional view of a relevant portion of the comparison example of a composite hose with a corrugated metal tube.

FIG. 6(B-2) is a view to explain an action of the comparison example of a composite hose with a corrugated metal tube.

DETAILED DESCRIPTIONS OF PREFERRED EMBODIMENTS

Figure 1:
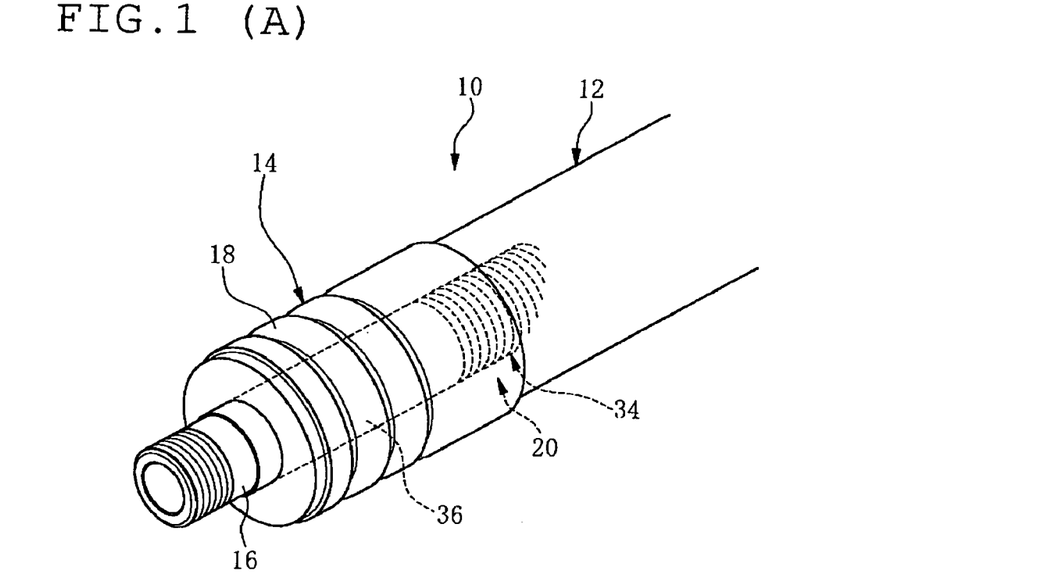
FIG. 1(A) is a perspective view of a composite hose with a corrugated metal tube of one embodiment according to the present invention.
FIG. 1(B) is a perspective view showing construction of the composite hose with a corrugated metal tube of FIG. 1(A).
Figure 2:
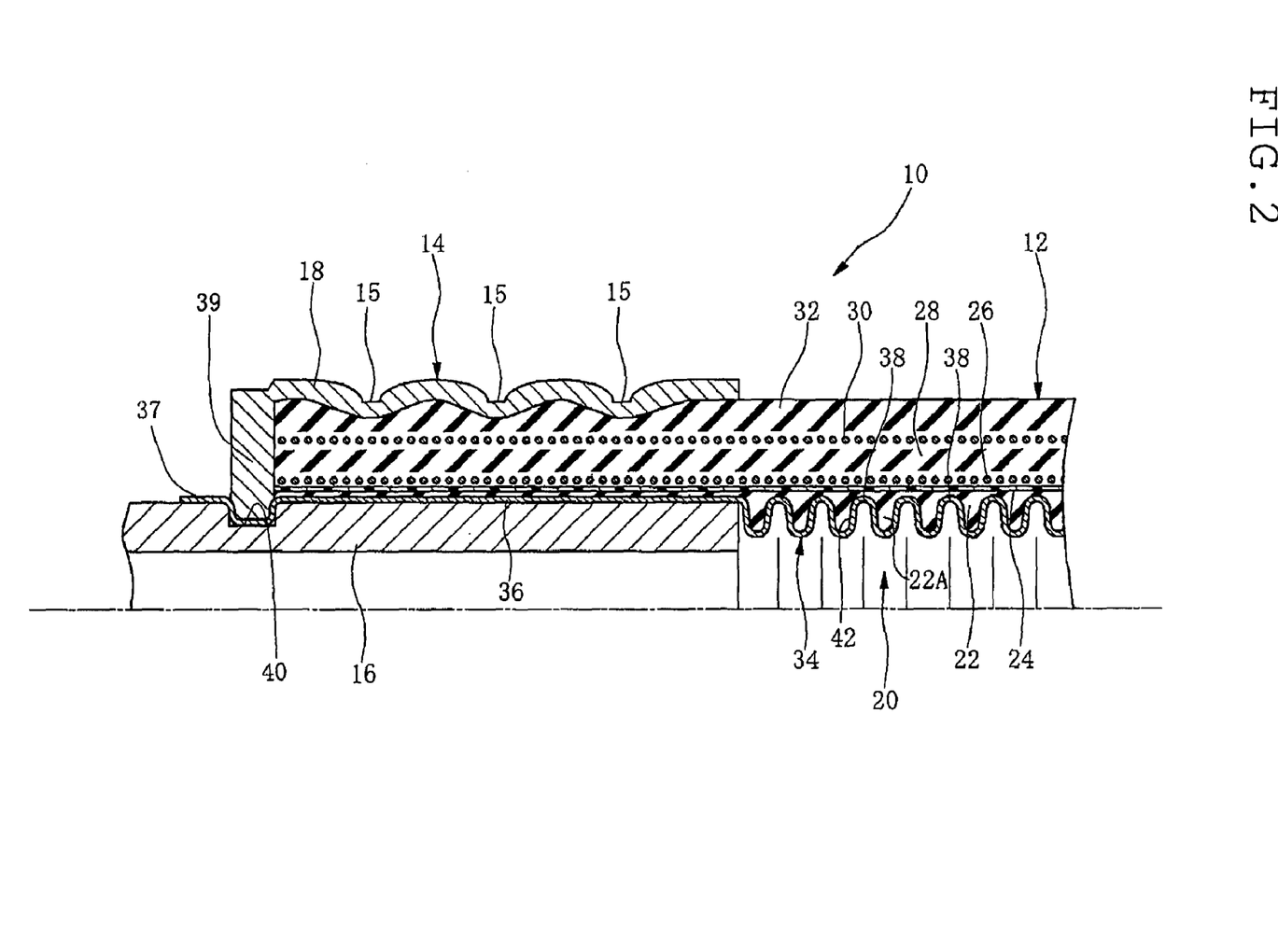
FIG. 2 is a cross-sectional view of a relevant portion of the composite hose with a corrugated metal tube of FIG. 1(A).

In FIGS. 1(A), 1(B) and 2, numeral reference 10 indicates a composite hose with a corrugated metal tube (hereinafter referred to just as a hose), numeral reference 12 a hose body, and numeral reference 14 a metal joint fitting attached on an end portion of the hose body 12. The joint fitting 14 has a metal insert fitting 16 like a pipe and a metal socket fitting 18 like a sleeve. The insert fitting 16 and the socket fitting 18 are fixedly secured on the end portion of the hose body 12 by securely compressing the socket fitting 18 onto the hose body 12 in a radially contracting direction.

The hose 10 has a corrugated metal tube 20 as an innermost layer. A radially outer side of the corrugated metal tube 20 are covered or laminated in sequence with a rubber filler layer 22 as an elastic filler layer, a hard resin layer 24 as a cover layer, a first reinforcing layer (protective reinforcement layer) 26, a middle rubber layer 28, a second reinforcing layer 30, and an outer surface rubber layer 32 as an outermost layer.

The corrugated metal tube 20 has a corrugated portion 34 and a straight-wall portion or straight-walled portion 36 of straight tubular shape on an end portion of the corrugated metal tube 20. The above insert fitting 16 is inserted inside the straight-walled portion 36, while the socket fitting 18 is securely compressed onto the end portion of the hose body 12 (refer to reference numeral 15), where the straight-walled portion 36 is disposed as an innermost layer. So, the straight-walled portion 36 of the corrugated metal tube 20 is pressed radially inwardly or in a diametrically contracting direction and held against or securely compressed onto the insert fitting 16 by the socket fitting 18 via outer layers, more specifically, the rubber filler layer 22, the hard resin layer 24, the first reinforcing layer 26, the middle rubber layer 28, the second reinforcing layer 30 and the outer surface rubber layer 32. Consequently, permeation resistance is ensured at a connected portion between the insert fitting 16 and the straight-walled portion 36. The straight-walled portion 36 includes an extending portion 37 which extends beyond an inwardly directed collar-like portion 39 of the socket fitting 18, axially outwardly from the outer layers. Here, the extending portion 37 is clamped between an inner end portion of the inwardly directed collar-like portion 39 of the socket fitting 18 and an annular groove 40 of the insert fitting 16. The extending portion 37 is pressed by the inwardly directed collar-like portion 39 and deformed along the annular groove 40.

The corrugated metal tube 20 of an innermost layer serves as a barrier layer against permeation of conveyed fluid, and is given flexibility by the corrugated portion 34.

Figure 3:
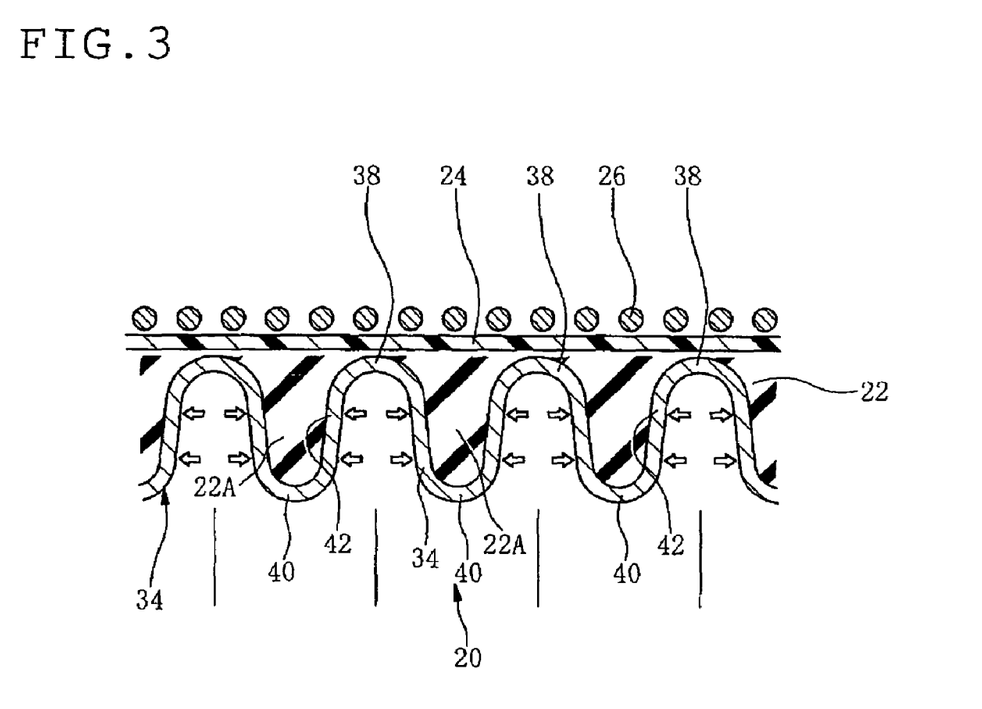
FIG. 3 is a view to explain an action of the composite hose with a corrugated metal tube according to the present invention.

The rubber filler layer 22 is a layer which is provided to penetrate in valley gaps 42 or gaps 42 between corrugation hills 38, 38 of the corrugated portion 34 on an outer peripheral side of the corrugated portion 34 as shown in FIG. 3. The whole of the rubber filler layer 22 substantially functions as a rubber filler 22A to penetrate in the valley gaps 42, and a thickness or a wall-thickness of the rubber filler layer 22 is very small between the corrugation hills 38 of the corrugated portion 34 and the resin layer 24. The rubber filler layer 22 is preferably a layer made of a solid rubber which is a nonfoamed material so as to have a major effect in restraining deforming in a radially expanding manner.

Here, the wall-thickness of the rubber filler layer 22 therebetween or at the corrugation hills 38 is 0.3 mm or less. Depending on the circumstances, the wall-thickness of the rubber filler layer 22 between the corrugation hills 38 and the resin layer 24 may be preferably zero.

The rubber filler layer 22, more specifically, the rubber filler 22A which penetrates in the valley gaps 42 between the corrugation hills 38, 38 serves to restrain the corrugated metal tube 20 from deformation in radially expanding and contracting manner under an internal pressure exerted thereto.

On the other hand, the first and the second reinforcing layers 26 and 30 are layers which are provided to secure pressure resistance and restrain the hose 10 entirely from being deformed in radial and longitudinal directions.

And, the middle rubber layer 28 serves to restrain the first reinforcing layer 26 and the second reinforcing layer 30 from being displaced, for example in an axial direction, with respect to one another. Further, the outer surface rubber layer 32 as outermost layer serves to protect the second reinforcing layer 30.

Meanwhile, the hard resin layer 24 as cover layer serves to enclose or confine the rubber filler 22A which is filled in the valley gaps 42 or gaps 42 between the corrugation hills 38, 38 on an outer peripheral side of the corrugated portion 34 within the valley gaps 42. Thus, the rubber filler 22A is prevented from escaping out of the valley gaps 42 radially outwardly when the corrugated metal tube 20 is deformed.

In this embodiment, the first reinforcing layer 26 is laminated and formed directly on an outer surface of the resin layer 24.

Here, a rubber layer may be interposed between the resin layer 24 and the first reinforcing layer 26. However, in the case where the first reinforcing layer 26 is braided or wound directly on an outer surface of the resin layer 24, direct contact is defined between the resin layer 24 and the first reinforcing layer 26. When the resin layer 24 and the first reinforcing layer 26 contact directly with one another, the first reinforcing layer 26 can effectively restrain radial change of the resin layer 24.

The above corrugated metal tube 20 preferably has a wall thickness of 0.5 mm or less in view of flexibility and elasticity required.

On the other hand, in view of workability or processability of a metal tube, a wall thickness of the corrugated metal tube 20 is preferably 0.1 mm or larger.

The corrugated metal tube 20 here has a single-layer construction. And, besides, the corrugated metal tube 20 may have a multilayer construction.

And, as for material of the corrugated metal tube 20, stainless steel, iron and steel, aluminum or aluminum alloy, copper or copper alloy, nickel or nickel alloy, titanium or titanium alloy, or the like may be used. The material of the corrugated metal tube 20 may be selected properly from these metals in view of resistance to conveyed fluid, durability against vibration/pressure, workability of a metal tube, or the like. Specifically, stainless steel is preferably used.

Then, the first reinforcing layer 26 and/or the second reinforcing layer 30 may be omitted in such case that an internal pressure exerted is low during conveying fluid and so on. However, generally, it is preferred to provide these reinforcing layers in order to secure pressure resistance.

In this embodiment, the first reinforcing layer 26 and the second reinforcing layer 30 are formed by winding or braiding a reinforcing wire member or reinforcing filament member at density of 80% or less, namely a winding or braiding density of 80% or less and thereby favorable flexibility is secured over the reinforcing layers themselves.

As for reinforcing wire members of the first reinforcing layer 26 and the second reinforcing layer 30, usable are reinforcing threads formed from organic fiber, and as for material or raw material for the reinforcing wire members, usable are various other materials. According to need, metal wire members may be used.

The above middle rubber layer 28 may have a wall thickness of an range between 0.1 mm and 5.0 mm. However, the wall thickness of the middle rubber layer 28 is preferably between 0.1 mm and 0.5 mm in view of wear prevention and unification for the first reinforcing layer 26 and the second reinforcing layer 30. And, the middle rubber layer 28 itself may have a multilayer construction.

Meanwhile, the rubber filler layer 22 preferably has a wall thickness of 0.3 mm or less outward from the corrugation hills 38 or at the corrugation hills 38 as stated above. Namely, the rubber filler layer 22 is filled completely in the valley gaps 42 to tops of the corrugation hills 38, and a radial thickness of the rubber filler layer 22 measured radially outwardly from a radial position of the tops of the corrugation hills 38, i.e., the radial thickness thereof measured radially outwardly at the tops of the corrugation hills 38 or the radial thickness thereof at the tops of the corrugation hills 38 is preferably designed 0.3 mm or less.

Materials for the middle rubber layer 28 and the rubber filler layer 22 are selected properly in view of adhesiveness to an adjacent layer, flexibility, resistance to service conditions (external liquid or mechanical shock) etc., workability, or the like.

For example, the material for the middle rubber layer 28 and the rubber filler layer 22 may be selected properly from natural rubber type, styrene-butadiene rubber type, butadiene rubber type, isoprene rubber type, chloroprene rubber type, butyl rubber type, nitrile rubber type, ethylene-propylene rubber type, acrylic rubber type, urethane rubber type, silicon rubber type, fluorocarbon rubber type, polysulfide rubber type, epichlorohydrin rubber type, propylene oxide rubber type, alfin rubber type or the like. And, Hypalon (trademark of Dupont) rubber type may be also selected.

As the case may be, other elastic materials than rubber such as thermoplastic elastomer may be used to form the rubber filler layer 22 and the middle rubber layer 28.

The outer surface rubber layer 32 may be omitted depending on service conditions. However, the outer surface rubber layer 32 is preferably provided in view of protecting the corrugated metal tube 20, reinforcing layers such as the first reinforcing layer 26 and the second reinforcing layer 30 from external liquid, mechanical shock or the like. The outer surface rubber layer 32 preferably has a wall thickness of about 0.2 mm to 2.0 mm.

A material for the outer surface rubber layer 32 is selected properly in view of adhesiveness to an adjacent layer, flexibility, resistance to service conditions (external liquid or mechanical shock) etc., workability, or the like.

For example, the material for the outer surface rubber layer 32 may be selected properly from natural rubber type, styrene-butadiene rubber type, butadiene rubber type, isoprene rubber type, chloroprene rubber type, butyl rubber type, nitrile rubber type, ethylene-propylene rubber type, acrylic rubber type, urethane rubber type, silicon rubber type, fluorocarbon rubber type, polysulfide rubber type, epichlorohydrin rubber type, propylene oxide rubber type, alfin rubber type or the like. And, Hypalon (trademark of Dupont) rubber type may be also selected.

And, as the case may be, other materials than rubber such as thermoplastic elastomer may be used to form the outer surface rubber layer 32.

In order to accommodate the functionality needs, the above hard resin layer 24 as cover layer preferably has such rigidity as not to allow its deformation under a stress which is generated by an internal pressure in the hose, and a wall thickness required for that. In that sense, the hard resin layer 24 may preferably have a wall thickness of 0.15 mm or larger.

On the other hand, if too large wall thickness thereof increases rigidity of the hose entirely and thereby impairs flexibility of the hose entirely. Therefore, preferably a maximum of the wall thickness of the resin layer 24 is 0.30 mm.

As for material for the hard resin layer 24, usable is resin such as an alloy material of polyamide-6 (PA6) and ethylene-propylene diene rubber (EPDM), polyethylene (PE), polypropylene (PP), PA6, polyamide-11 (PA11), polyamide-12 (PA12), polyethylene terephthalate (PET), polybutylene terephthalate (PBT), polybuthylene naphthalate (PBN), polyvinylidene fluoride (PVDF), ethylene-tetrafluoroethylene copolymer (ETFE), polytetrafluoroethylene (PTFE), polyphnylene sulfide (PPS), acrylonitrile-butadiene-styrene copolymer (ABS), polyethylene-vinyl acetate (EVA) or the like.

Anyway, as the hard resin layer 24 as cover layer is required resistance to deformation, the hard resin layer 24 preferably has a tensile modulus of 100 MPa or larger.

EXAMPLE

Figure 4:
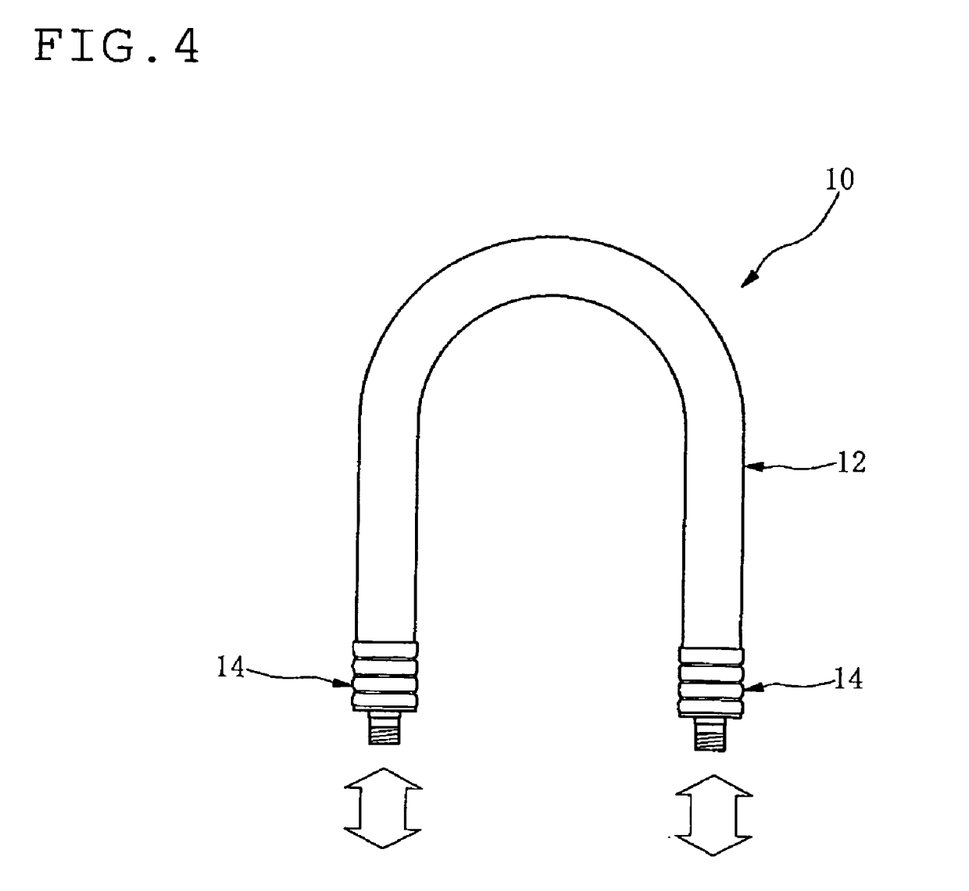
FIG. 4 is a view showing a bending shape of a composite hose with a corrugated metal tube in a repeated pressure test.

A comparison sample and a sample of the composite hose with a corrugated metal tube 10 which are constructed as shown in Table 1 are prepared. Then, the comparison sample and the sample are bent in U-shape in a manner shown in FIG. 4 and an impulse test (pressure cycle repetition test) was conducted on the comparison sample and the sample under the following test conditions to evaluate durability of them.

The results are shown in Table 1.

<Impulse test>

Bend R (radius): 70 mm

Temperature: 130° C.

Pressure: 0<=>22.5 Mpa

Frequency (pressure cycle repetitions/minute): 30 cpm

TABLE 1

Hose construction and test results

| | Comparison Example | Sample |
|---|---|---|
| Corrugated metal tube | SUS304 | <-- |
| Inner diameter × outer diameter | diameter 4.5 × diameter 9.7 (mm) | <-- |
| Corrugation pitch | 2.0 (mm) | <-- |
| Wall thickness | 0.23 (mm) | <-- |
| Rubber filler layer | EPDM | <-- |
| Hard resin layer | Not provided | Alloy of nyloyn6 (Ny6)/EPDM (t = 0.20 mm) *1 |
| First reinforcing layer | Braided with aramid thread (braid density 80%) | <-- |
| Middle rubber layer | EPDM (t = 0.3 mm) | <-- |
| Second reinforcing layer | Braided with 0.20 wire | <-- |
| Outer surface rubber layer | EPDM (t = 1.0 mm) | <-- |
| Impulse test (No. of cycle) | 7000, 8000 | after 120,000, stopped (n = 2) *2 |

*1 "Alloy of Ny6/EPDM" has a tensile modulus of about 400 MPa.
*2 The character "n" indicates the number of times the test is conducted.

As shown in Table 1, the comparison example which is not provided with the hard resin layer 24 as cover layer comes to its fatigue life by applying fewer than 10,000 cycles of pressure. However, the sample develops no abnormality even when applying up to 120,000 cycles of pressure.

The comparison example is examined after the impulse test and it is found that the rubber filler 22A which had penetrated in valley gaps 42 escaped out of the valley gaps 42 and a crack ran in corrugation hills 38 in a circumferentially direction.

As apparent from the above test results, duration life of the corrugated metal tube 20, therefore of the hose 10 is extremely enhanced by providing the hard resin layer 24.

Figure 5:
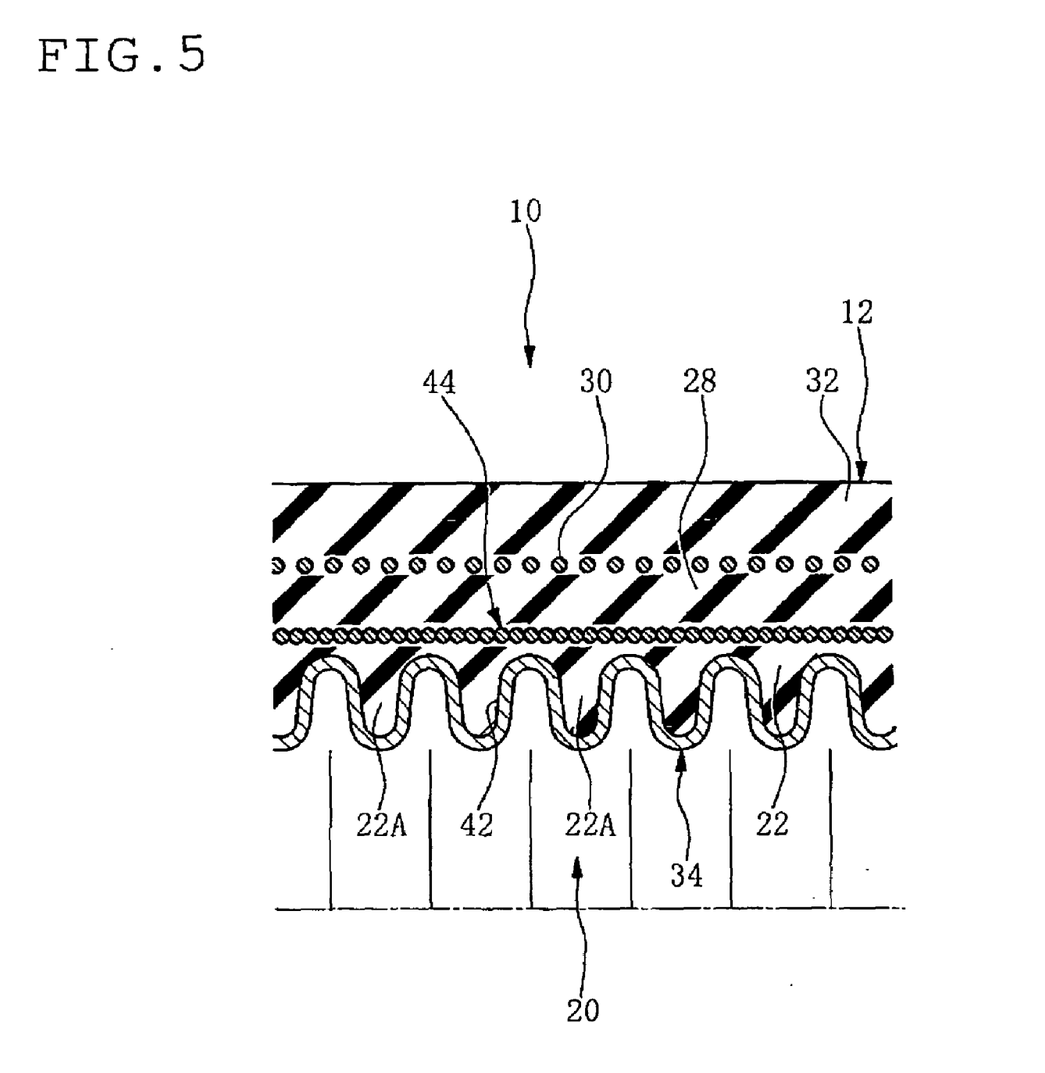
FIG. 5 is a cross-sectional view of a relevant portion of another composite hose with a corrugated metal tube according to the present invention.

FIG. 5 shows another embodiment of the present invention.

In the another embodiment, a reinforcing layer 44 is formed by winding or braiding a reinforcing wire member or reinforcing filament member at high density of 95% or more, namely, a winding or braiding density of 95% or more and is adapted for a cover layer instead of the hard resin layer 24.

A winding or braiding density of the reinforcing layer 44 may be increased to near 100%.

In case where such reinforcing layer 44 is provided as cover layer, it is also possible to favorably prevent the rubber filler 22A which is filled in the valley gaps 42 from escaping radially outwardly. Therefore, in this case, it is also possible to effectively enhance durable life of the corrugated metal tube 20, therefore of the hose 10.

Although the present invention has been described in terms of preferred embodiments, it will be understood that a variety of modifications can be made without departing from the spirit and the scope of the invention.

What is claimed is:

1. A composite hose, comprising:
    a corrugated metal tube that is unitary in construction and provides a continuous barrier layer against permeation of conveyed fluid;
    elastic filler filled in valley gaps between corrugation hills on an outer peripheral side of the corrugated metal tube; and
    a cylindrical cover layer provided on an outer side of the corrugated metal tube, the cylindrical cover layer enclosing the elastic filler within the valley gaps to prevent the elastic filler from escaping radially outwardly, wherein the cylindrical cover layer is a hard resin layer, and the hard resin layer has a wall thickness of 0.15 mm to 0.30 mm.

2. A composite hose, comprising:

a corrugated metal tube that is unitary in construction and provides a continuous barrier layer against permeation of conveyed fluid;

elastic filler filled in valley gaps between corrugation hills on an outer peripheral side of the corrugated metal tube;

a cylindrical cover layer provided on an outer side of the corrugated metal tube, the cylindrical cover layer enclosing the elastic filler within the valley gaps to prevent the elastic filler from escaping radially outwardly, wherein the cylindrical cover layer is a hard resin layer;

a reinforcing layer laminated directly on an outer surface of the hard resin layer, wherein the reinforcing layer is a braided reinforcing wire member.

3. A composite hose, comprising:

a corrugated metal tube that is unitary in construction and provides a continuous barrier layer against permeation of conveyed fluid;

elastic filler filled in valley gaps between corrugation hills on an outer peripheral side of the corrugated metal tube;

a reinforcing layer provided on an outer side of the elastic filler;

a cylindrical cover layer provided on an outer side of the corrugated metal tube and in an inner side of the reinforcing layer, the cylindrical cover layer enclosing the elastic filler within the valley gaps to prevent the elastic filler from escaping radially outwardly; and wherein the cover layer is another reinforcing layer comprising a braided reinforcing wire member, and has a high density of 95% or more.

4. A composite hose, comprising:

a corrugated metal tube that is unitary in construction and provides a barrier layer against permeation of conveyed fluid;

elastic filler filled in valley gaps between corrugation hills on an outer peripheral side of the corrugated metal tube;

a reinforcing layer provided on an outer side of the elastic filler;

a cylindrical cover layer provided on an outer side of the corrugated metal tube and on an inner side of the reinforcing layer, the cylindrical cover layer enclosing the elastic filler within the valley gaps to prevent the elastic filler from escaping radially outwardly, wherein the cover layer is another reinforcing layer comprising a wound reinforcing wire member that has a density of 95% or more.

* * * * *